US00RE41749E

(19) United States
(12) Reissued Patent
Stolz et al.

(10) Patent Number: US RE41,749 E
(45) Date of Reissued Patent: Sep. 21, 2010

(54) ELECTRICAL CONNECTOR AND CIRCUIT CARD ASSEMBLY

(75) Inventors: William H. Stolz, Sutton, MA (US); Joseph P. King, Sterling, MA (US); Albert F. Beinor, Sutton, MA (US); Philip J. Roux, Sutton, MA (US); Mickey S. Felton, Sterling, MA (US)

(73) Assignee: EMC Corporation, Hopkinton, MA (US)

(21) Appl. No.: 12/603,337

(22) Filed: Oct. 21, 2009

Related U.S. Patent Documents

Reissue of:
(64) Patent No.: 7,481,679
Issued: Jan. 27, 2009
Appl. No.: 11/694,094
Filed: Mar. 30, 2007

U.S. Applications:
(60) Provisional application No. 60/863,905, filed on Nov. 1, 2006.

(51) Int. Cl.
*H01R 25/00* (2006.01)

(52) U.S. Cl. ..... 439/638; 439/78
(58) Field of Classification Search ..... 439/76.1, 439/638, 654, 78, 635
See application file for complete search history.

(56) References Cited

U.S. PATENT DOCUMENTS 4,686,506 A * 8/1987 Farago ..... 341/100
5,148,354 A * 9/1992 Roth ..... 361/760
6,614,652 B2 * 9/2003 White et al. ..... 361/684
7,160,141 B2 * 1/2007 Marshall et al. ..... 439/451
7,494,383 B2 * 2/2009 Cohen et al. ..... 439/638
7,497,739 B2 * 3/2009 Zhang et al. ..... 439/638
7,578,704 B2 * 8/2009 Yang et al. ..... 439/638
2002/0173188 A1 * 11/2002 Follingstad et al. ..... 439/188
2008/0305689 A1 * 12/2008 Zhang et al. ..... 439/638
2008/0305690 A1 * 12/2008 Zhang et al. ..... 439/638
2009/0221161 A1 * 9/2009 Zhu ..... 439/78

* cited by examiner

*Primary Examiner*—Edwin A. Leon
*Assistant Examiner*—Vanessa Girardi
(74) *Attorney, Agent, or Firm*—Guerin & Rodriguez, LLP; Michael A. Rodriguez

(57) ABSTRACT

Described is an electrical connector assembly with an electrical connector having a connector body that includes a receptacle connector portion at a first end and a plug connector portion at a second end opposite the first end. The receptacle connector portion has electrical contacts within an opening for mating with a plug electrical connector at the first end of the connector body. The plug connector portion has electrical contacts within an opening for mating with a receptacle electrical connector at the second end. The connector body has an electrical conductor that is in electrical communication with at least one of the electrical contacts and extends from one side of the connector body. A circuit card is disposed adjacent to that one side of the connector body and is in electrical communication with the at least one electrical contact through the electrical conductor extending from the side of the connector body.

28 Claims, 17 Drawing Sheets

ELECTRICAL CONNECTOR AND CIRCUIT CARD ASSEMBLY

Matter enclosed in heavy brackets [ ] appears in the original patent but forms no part of this reissue specification; matter printed in italics indicates the additions made by reissue.

RELATED APPLICATION

This utility application claims the benefit of U.S. Provisional Patent Application No. 60/863,905, filed on Nov. 1, 2006, the entirety of which is incorporated by reference herein.

FIELD OF THE INVENTION

The present invention relates generally to electronics enclosures and electrical connector assemblies. More particularly, the present invention relates to an electrical connector assembly for electrically and physically coupling disk drives to a midplane within a disk array enclosure.

BACKGROUND

Some disk array enclosures use hard disk drives that require 12 volts DC only, and the midplane (or backplane) to which such disk drives are electrically connected provides the requisite voltage (i.e., 12 volts only). Additionally, some disk array enclosures use hard disk drives with customized features that enhance their suitability within a product. These features include, but are not limited to, on/off control, soft-start control, current-limit protection, and logic signal conditioning. To reduce the cost of disk array enclosures, one trend is to use commodity (i.e., off-the-shelf) disk drives. Commodity disk drives, however, can require more than a single voltage level, such as 12 volts DC and 5 volts DC. These disk drives may also lack the prerequisite enhanced features needed to make them suitable in a particular application or product. To use such commodity disk drives in these disk array enclosures therefore requires means, external to the disk drive, for converting the 12 volts supplied by the midplane into each required voltage level, for producing certain system functionality (e.g., the enhanced features), or both.

To perform this voltage conversion (and various system functionality, such as previously described), an external, small circuit card (also called a paddle card or an adapter board) is disposed between the midplane and the disk drive. This circuit card includes electrical signal paths and circuitry, e.g., for delivering a 5-volt and 12-volt supply to the disk drive based on the 12-volt supply provided by the midplane, for passing through the 12 volts from the midplane to meet the 12-volts requirements of the disk drive, and for providing the various enhanced functionality.

SUMMARY

In one aspect, the invention features an electrical connector assembly an electrical connector having a connector body with a receptacle connector portion at a first end and a plug connector portion at a second end opposite the first end. The receptacle connector portion has electrical contacts within an opening for mating with a plug electrical connector at the first end of the connector body. The plug connector portion has electrical contacts within an opening for mating with a receptacle electrical connector at the second end of the connector body. The connector body has an electrical conductor that is in electrical communication with at least one of the electrical contacts and extends from one side of the connector body. A circuit card is disposed adjacent to that one side of the connector body and is in electrical communication with the at least one electrical contact through the electrical conductor extending from the side of the connector body.

In another aspect, the invention features an electronics enclosure comprising a disk drive assembly having a disk drive and a disk drive connector extending from one end of the disk drive. A midplane has a midplane connector extending from one side thereof. An electrical connector assembly electrically couples the disk drive assembly to the midplane. The electrical connector assembly includes an electrical connector having a connector body with a receptacle connector portion at a first end and a plug connector portion at a second end opposite the first end. The receptacle connector portion has electrical contacts within an opening for mating with a plug electrical connector at the first end of the connector body. The plug connector portion has electrical contacts within an opening for mating with a receptacle electrical connector at the second end of the connector body.

The connector body has an electrical conductor that is in electrical communication with at least one of the electrical contacts and extends from one side of the connector body. A circuit card is disposed adjacent to that one side of the connector body and is in electrical communication with the at least one electrical contact through the electrical conductor extending from the side of the connector body.

In another aspect, the invention features an electrical connector assembly having an electrical connector body with a first electrical connector at a first end and with a second electrical connector at a second end opposite the first end. Each electrical connector has a plurality of electrical contacts. The electrical connector body has an electrical conductor that is in electrical communication with at least one of the electrical contacts and extends from one side of the connector body. A circuit card is disposed adjacent to that one side of the connector body and is in electrical communication with the at least one electrical contact through the electrical conductor extending from the side of the connector body. The electrical connector assembly has means for holding the circuit card adjacent to the connector body.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Electrical connector assemblies of the present invention have a connector body with back-to-back first and second electrical connector portions. Extending from one side of the connector body are electrically conductive pins. A circuit board disposed adjacent to this side of the connector body couples to these electrical conductors and is thereby in electrical communication with the first and second electrical connector portions. In some embodiments, the electrical connector assembly includes a cardholder for holding the circuit card adjacent to the one side of the connector body.

Various types of electrical signal paths pass through the connector body. Some electrical signal paths pass directly through from the first electrical connector portion to the second electrical connector portion. Other electrical signal paths pass from the connector body to the circuit card, where such signal paths may terminate or propagate and return to connector body. For those signal paths passing through the circuit card, the circuit card has circuitry for responding to or operating upon the signals carried by the paths, e.g., to provide enhanced functionality or to perform signal conversions, such as converting a 12-volt power supply signal into a 5-volt power supply signal.

One exemplary use for the electrical connector assembly is to connect a disk drive to a midplane or backplane of a disk array enclosure. The first connector portion of the electrical connector assembly connects to an electrical connector of the disk drive and the second connector portion of the electrical connector assembly connects to an electrical connector on the midplane.

Figure 1:
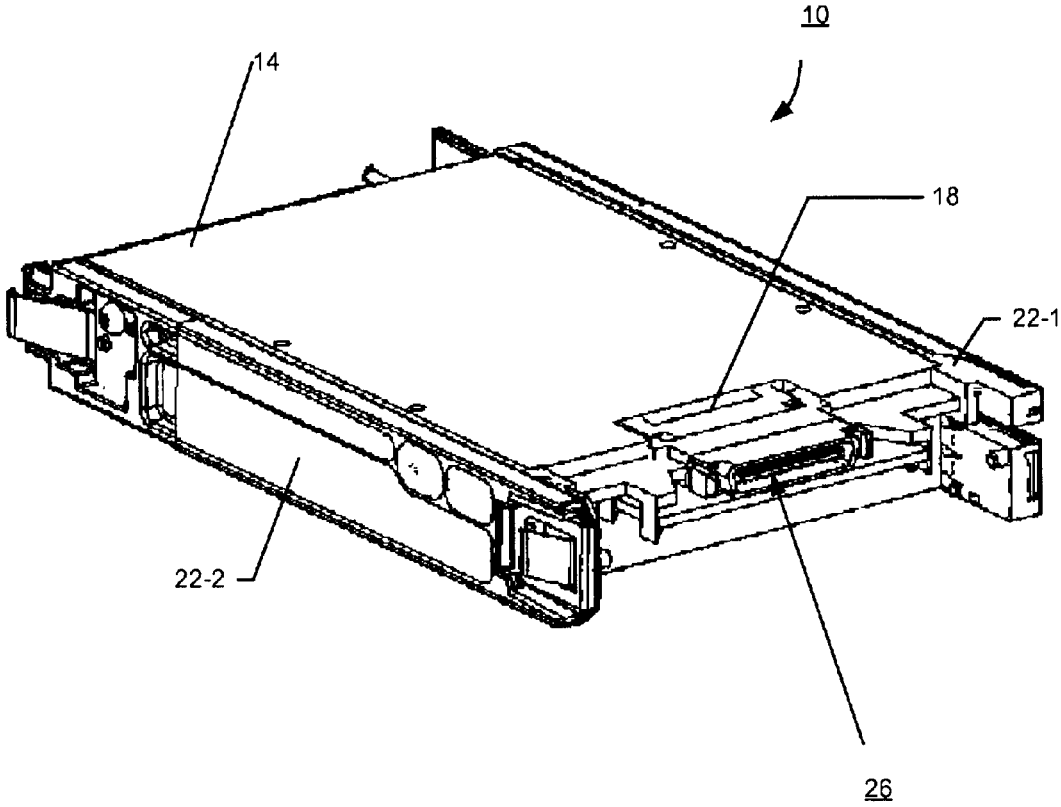
FIG. 1 is a diagram of an embodiment of a disk drive assembly including an embodiment of an electrical connector assembly constructed in accordance with the invention.

FIG. 1 shows an embodiment of a disk drive assembly 10 constructed in accordance with the invention. The disk drive assembly 10 includes a disk drive 14 with a disk drive connector 18 that physically and electrically connects to an embodiment of an electrical connector assembly 26 constructed in accordance with the invention. Opposite sides of the disk drive 14 are coupled to opposing carrier rails 22-1, 22-2 (generally, 22). Types of disk drives with which the electrical connector assembly 26 may be used include, but are not limited to, Fibre Channel and Advanced Technology Attachment (ATA) drives. In one embodiment, the disk drive 14 is of a type that requires 5 volts and 12 volts for proper operation. In another embodiment, the disk drive 14 is of a type needing only 12 volts.

Figure 2:
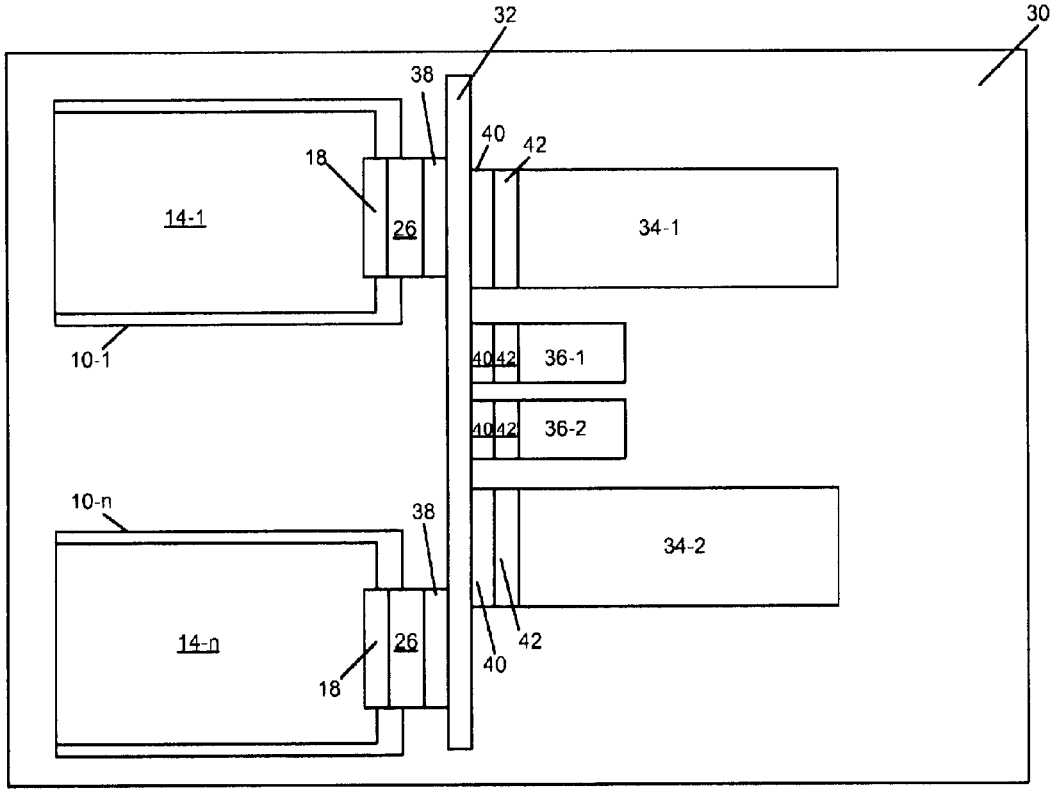
FIG. 2 is a block diagram of an embodiment of an electronics enclosure having a midplane coupled to a plurality of disk drives through electrical connector assemblies of the present invention.

FIG. 2 shows a block diagram of an embodiment of an electronics enclosure 30 (here, e.g., a disk array enclosure) within which the electrical connector assembly 26 of the present invention may be embodied. The electronics enclosure 30 includes disk drive assemblies 10-1, 10-n (generally, 10), a midplane 32, redundant (e.g., link) control cards 34-1, 34-2 (generally, 34), and redundant power supplies 36-1, 36-2 (generally 36). The midplane 32 includes disk-drive-side connectors 38 and supply-side connectors 40. Each control card 34 and each power supply 36 has a connector 42 for mating with a corresponding supply-side connector 40. Each disk drive assembly 10-1, 10-n includes a respective disk drive 14-1, 14-n with a disk drive connector 18. An electrical connector assembly 26 of the invention electrically and physically couples the disk drive connector 18 with a disk-drive-side connector 38 of the midplane 32.

Figure 3:
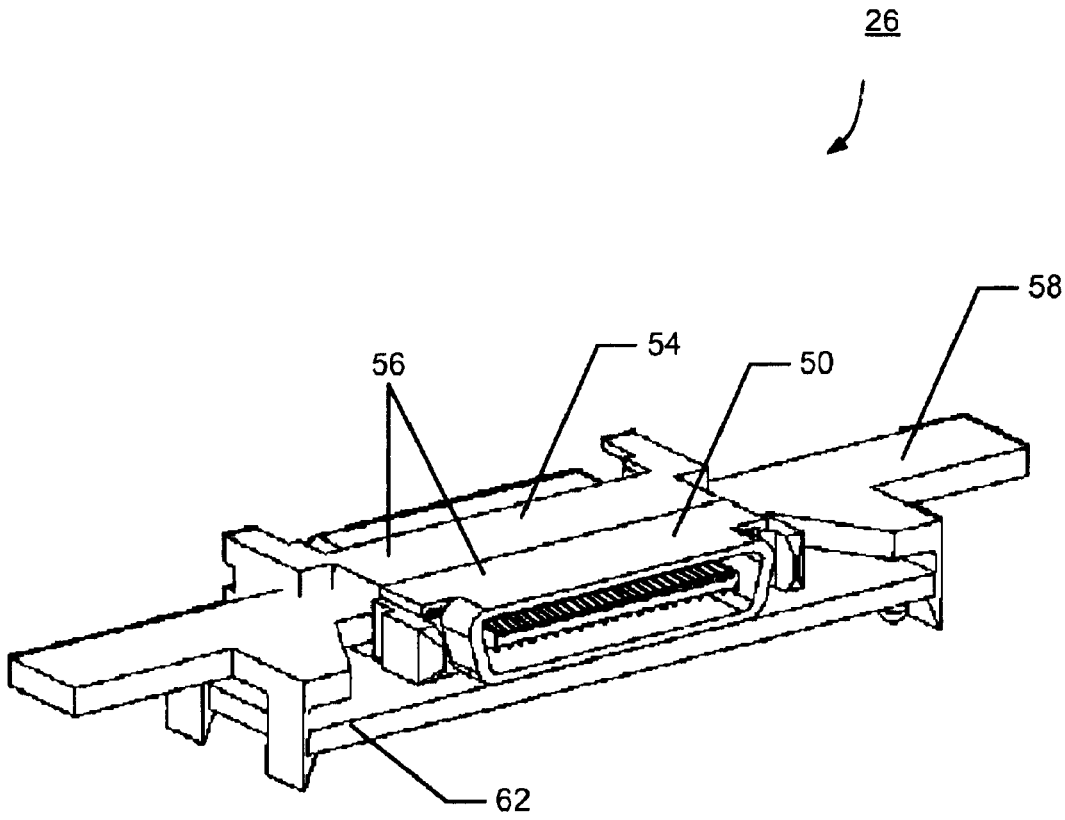
FIG. 3 is a diagram of an embodiment of the electrical connector assembly of FIG. 1 used to couple a midplane to a disk drive, the electrical connector including a circuit card.

FIG. 3 shows an embodiment of the electrical connector assembly 26 in detail. The electrical connector assembly 26 includes a plug connector portion 50, a receptacle connector portion 54, and a cardholder portion 58 extending approximately midway from each side of the receptacle connector portion 54. The plug connector portion 50 and receptacle connector portion 54 make up a unitary connector body 56 (e.g., injection-molded plastic). The connector body 56 may also be integrally formed as a single unit with the cardholder portion 58. In addition, the width of the electrical connector assembly 26, determined by the span of the cardholder portion 58, may be designed to fit into a 2.5" or a 3.5" disk drive slot.

In one embodiment, the plug and receptacle connector portions 50, 54 conform to SCA-2 industry standards for SCA connectors. In general, SCA-2 standards, e.g., SFF (Small Form Factor) Committee standard SFF-8045 for 40-pin SCA-2 Connector w/ Parallel Selection, SFF-8451 for 40- and 80-pin SCA connectors, and draft standard SFF-8053i for 20-pin SCA connectors, specify the size, length, width, height, board mounting, pin location, and specific mating features. Other embodiments of the plug and receptacle connector portions 50, 54 include, but are not limited to, Serial Attached SCSI (SAS) connectors and Serial Advanced Technology Attachment (SATA) connectors. The housing of the plug and receptacle connector portions 50, 54 can be made of plastic.

In one embodiment, the cardholder portion 58 holds a circuit card 62 adjacent to one side of the connector body 56. Electrically conductive pins (not shown) emerge from the side of the connector body 56 and enter through-holes in the circuit card 62, to couple the circuit card 62 electrically to the plug and receptacle connector portions 50, 54. Soldering may be used to join the electrically conductive pins to the circuit card 62. Although only one circuit card is shown in FIG. 3, it is to be understood that multiple electrically interconnected circuit cards may be stacked together and coupled to the connector body.

Exemplary implementations of the circuit card 62 include, but are not limited to, a printed circuit board (PCB) and a flex circuit. In general, the circuit card 62 includes circuitry for achieving special-purpose functionality. To achieve this functionality, the circuitry can include a variety of components, e.g., active and passive devices, integrated circuit chips or devices, and light-emitting diodes. These components can be disposed on either or both sides of the circuit card 62. On the side of the circuit board 62 facing the connector body 56, the circuit card 62 can have mechanical standoffs that come against and may couple to the connector body 56. In addition to providing structural support, such standoffs ensure a certain amount of spacing between components on that side of the circuit card 62 and the connector body 56. The spacing may be useful in allowing cooling air to flow over the devices on the circuit card 62.

In one embodiment, the circuitry of the circuit card 62 converts a 12-volts supply signal into a 5-volts supply. In other embodiments, the circuitry of the circuit card 62 provides certain disk drive functionality, e.g., on/off control, soft-start control, current-limit protection, logic signal conditioning, or combinations thereof. The circuitry can achieve other types of functionality without departing from the principles of the invention.

Figure 4:
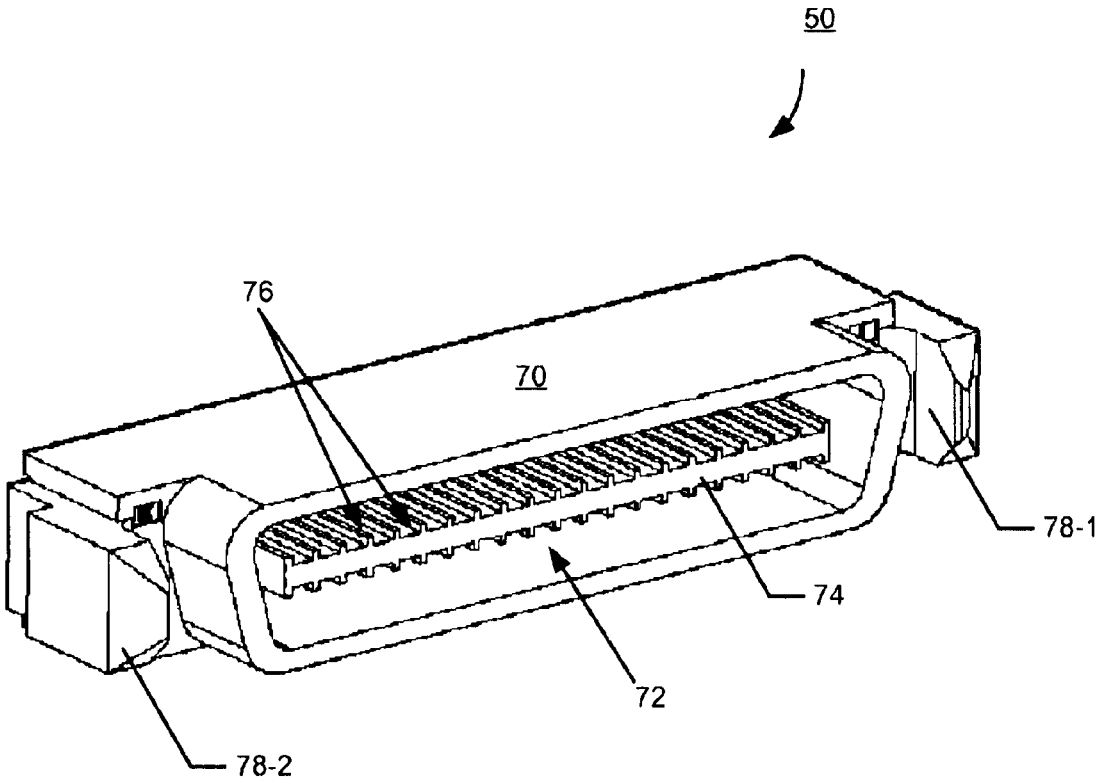
FIG. 4 is a diagram of an embodiment of a plug connector portion of the electrical connector assembly of FIG. 3, having a connector body with electrical contacts and an arm on each side thereof.

FIG. 4 shows an embodiment of the plug connector portion 50 of the electrical connector assembly 26. The plug connector portion 50 has a connector body portion 70 with a plug opening 72 and an arm 78-1, 78-2 on each side thereof. Within the plug opening 72 is a plug member 74 comprised of electrical contacts 76.

Figure 5A:
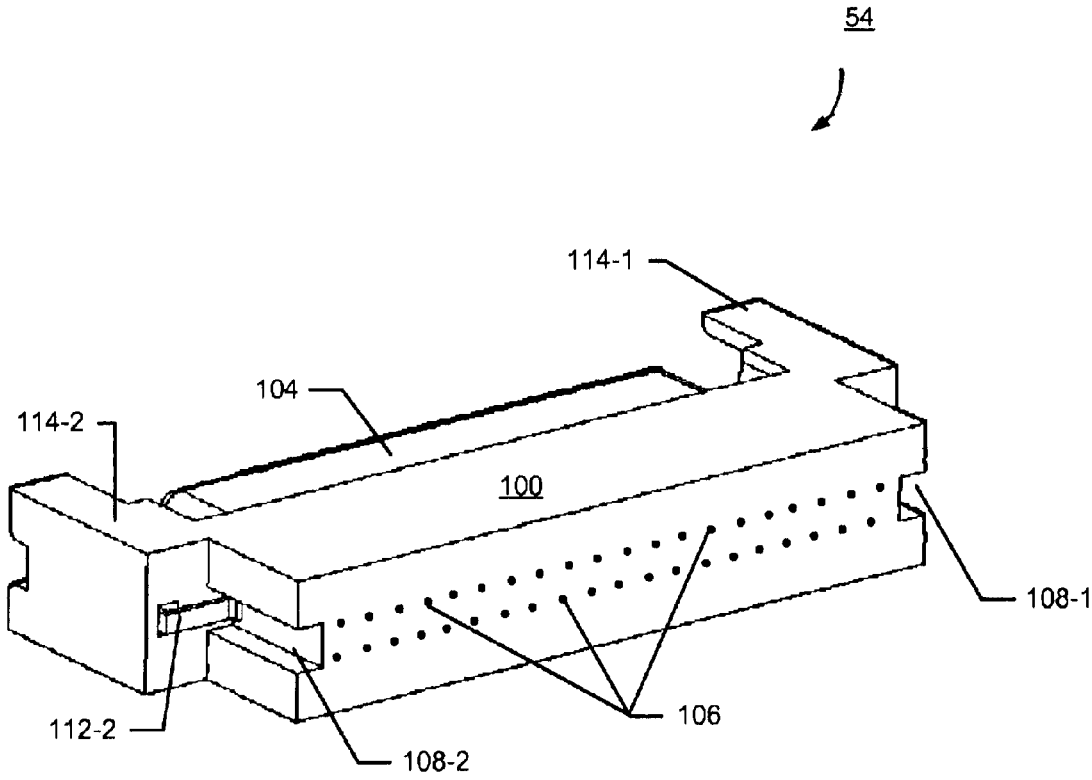
FIG. 5A is a back view of an embodiment of a receptacle connector portion of the electrical connector assembly of FIG. 3.
Figure 5B:
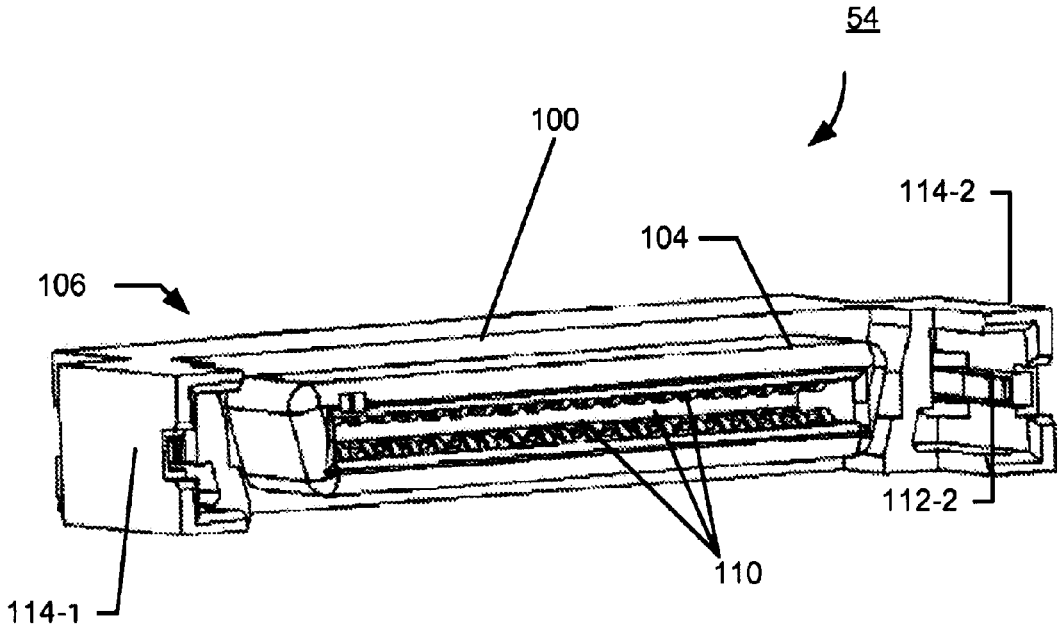
FIG. 5B is a disk-side view of the receptacle connector portion of FIG. 5A.

FIG. 5A and FIG. 5B show an embodiment of the receptacle connector portion 54 having a connector body portion 100 with a receptacle member 104 comprised of electrical contacts (not visible). The connector body 100 portion has electrically conductive pins 106 passing therethrough and lateral grooves 108-1, 108-2 (generally, 108) on opposite sides thereof, from which the cardholder portion 58 laterally extends. These grooves 108 are representative of the general location of where the cardholder portion 58 meets the connector portion 54. Such grooves need not exist for an integrally formed electrical connector assembly 26, as mentioned previously. Near each groove 108 is electrical ground contact (only contact 112-2 is visible), which electrically communicates with electrical ground in the plug connector portion 50 and electrical ground on the circuit card 62. The ground contacts 112 extend into opposing connector arms 114-1, 114-2. As shown in FIG. 5B, the receptacle member 104 has a cavity with upper and lower rows of electrical contacts 110 for receiving therebetween an edge of a plug electrical connector.

Figure 6:
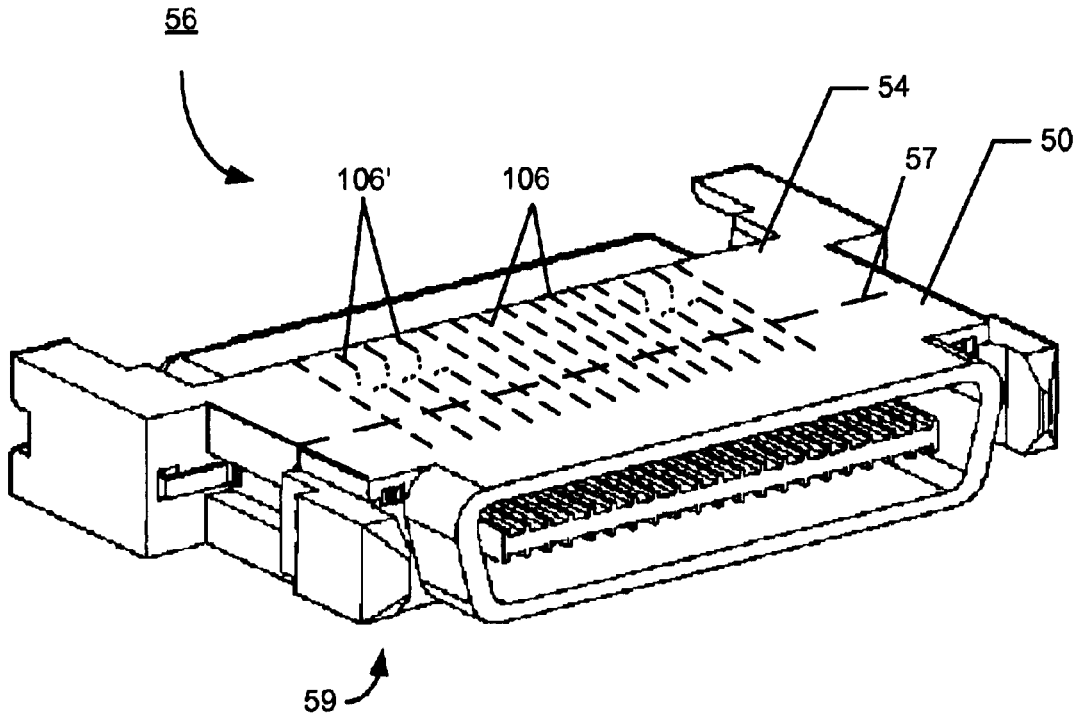
FIG. 6 is a diagram of a plug connector portion together with the receptacle connector portion of FIG. 3.

FIG. 6 shows the connector body 56 with the plug connector portion 50 and the receptacle connector portion 54 together, as an embodiment of the connector body 56 if constructed separately from the cardholder portion 58. The dashed line 57 represents an approximate delineation between the connector portions 50, 54, there being no actual delineation in an integrally formed connector body 56. Electrically conductive pins 106, 106' (generally 106) within the connector body 56 extend between the plug connector portion 50 and the receptacle connector portion 54. Some of the pins 106 pass straight through (i.e. continuously) and other pins 106' bend generally perpendicular from the plane of the connector body 56 and emerge from the side 59 of the connector body 56. Those pins shown are merely illustrative. The connector body 56 can have more or fewer of each type of pin, and in different locations, than those shown.

Figure 7:
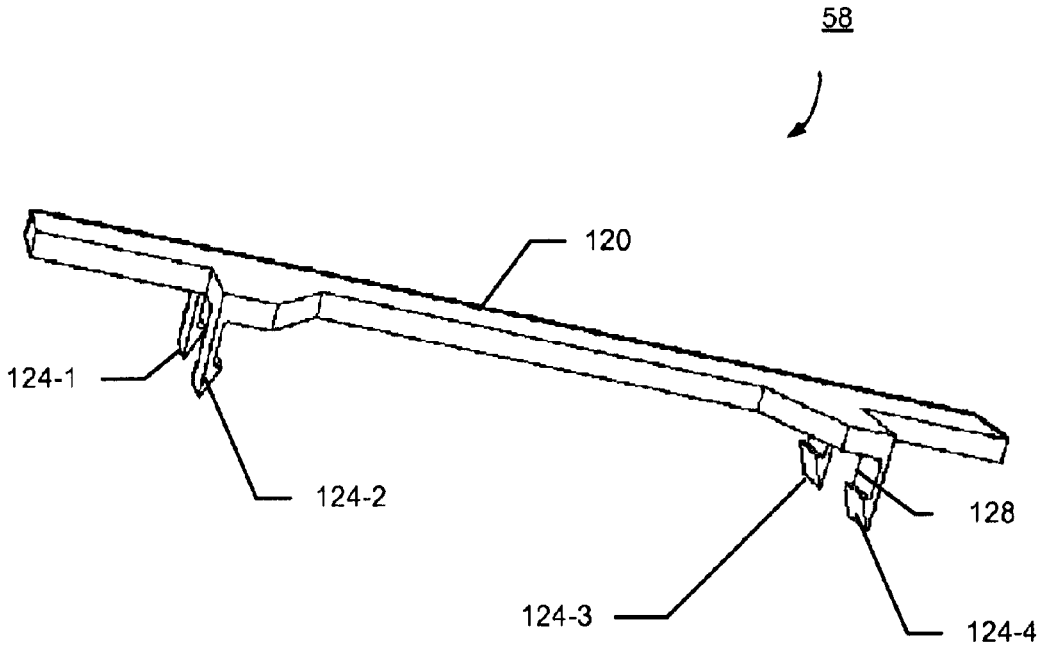
FIG. 7 is a diagram of an embodiment of a cardholder portion of the electrical connector assembly of FIG. 3.

FIG. 7 shows an embodiment of the cardholder portion 58 having a cardholder body 120 with four cardholding posts 124-1, 124-2, 124-3, 124-4 (generally, 124) extending perpendicularly from the same side of the cardholder portion 58. Each post 124 has a notch 128 for receiving an edge of the circuit card 62 (here, two posts for each opposite edge of the circuit card 62). The posts 124 hold the circuit card 62 parallel to the cardholder body 120. To insert a circuit card 62 into the notches 128 of the cardholder portion 58, the circuit card 62 is urged against the sloped surfaces of the four posts 124, with the appropriate through-holes of the circuit card 62 in alignment with the pins extending from the side of the connector body 56. The posts 124 are flexible and bend outwardly to allow the circuit card 62 to snap into place within the notches 128, the posts 124 then returning to their original position.

Figure 8:
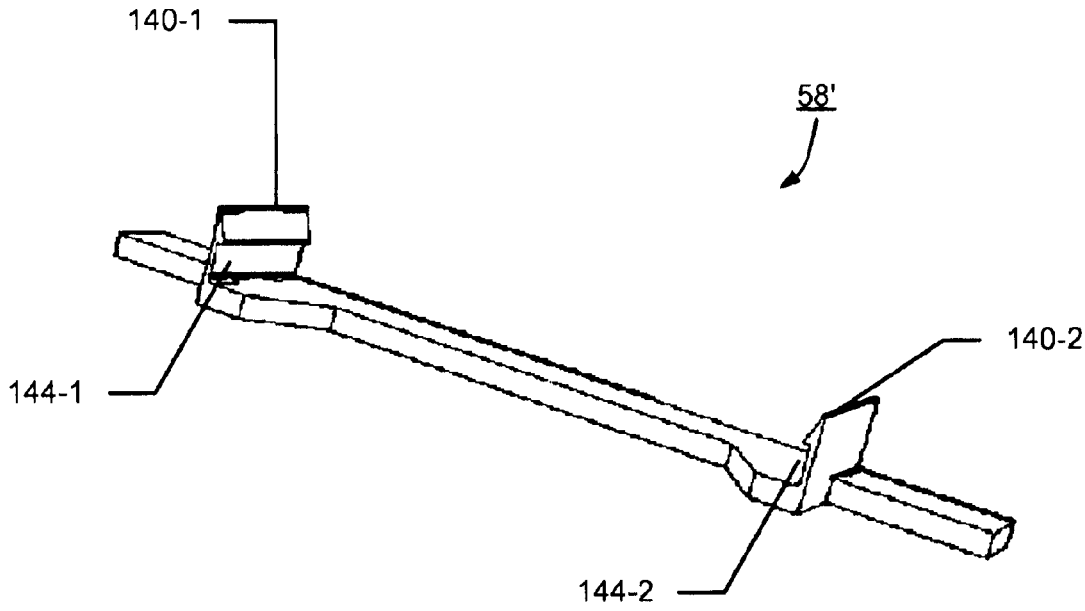
FIG. 8 is a diagram of another embodiment of a cardholder portion of the electrical connector assembly of FIG. 3.

Another embodiment of a cardholder 58' includes sidewalls (140-1, 140-2) with cardholding grooves (144-1, 144-2) formed therein, as shown in FIG. 8. Still other embodiments of electrical connector assemblies lack such cardholders: that is, the circuit card 62 can be held against and secured to the side of the connector body 56 by other types of holding means (e.g., screws, bolts, adhesives, soldering), without departing from the principles of the invention.

Figure 9:
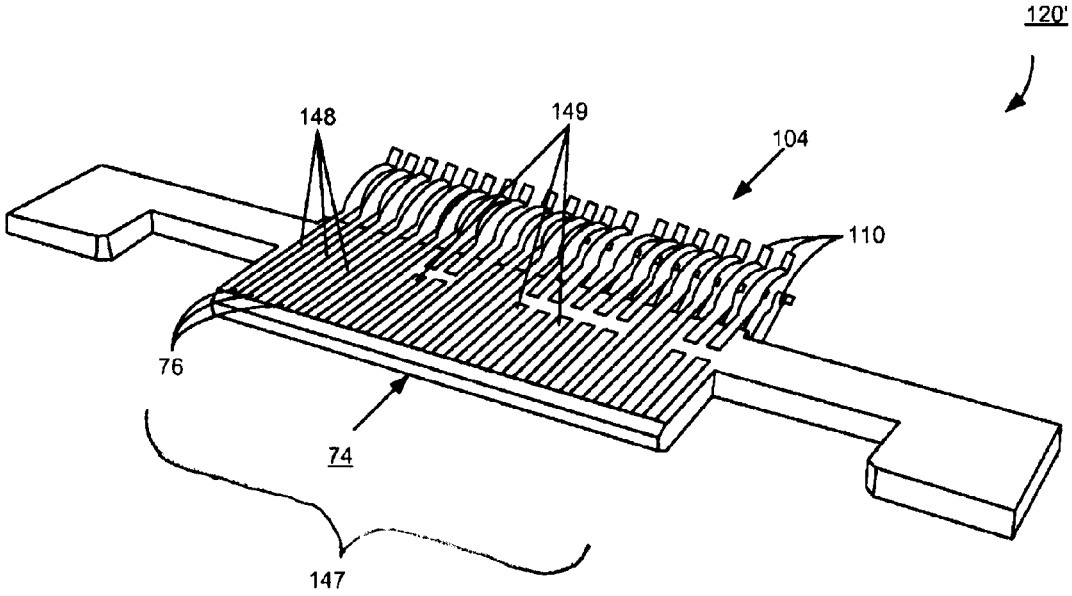
FIG. 9 is a diagram of an embodiment of the cardholder body having electrical traces that extend between a receptacle member of the receptacle connector portion and a plug member of the plug connector portion.

FIG. 9 shows an embodiment of a cardholder body 120' (here shown without any posts 124). A central portion 147 of the cardholder body 120' may be implemented as a multilayer printed circuit board. Conductive electrical traces 148, 149 run along a surface of the central portion 147 of the cardholder body 120' between the plug member 74 and the receptacle member 104 (the connector body 56 that encapsulates the electrical traces being absent in order to facilitate the illustration). Some of the electrical traces 148 extend continuously from an electrical contact 76 at the plug member 74 to an electrical contact 110 at the receptacle member 104. Such electrical traces are examples of "pass through" electrical signal paths.

Other electrical traces 149 are discontinuous, i.e., there is a gap in the electrical trace between an electrical contact 76 at the plug member 74 and an electrical contact 110 at the receptacle member 104. Instead of being direct pass-through electrical signal paths, these electrical traces 149 provide electrical signal paths that pass to the circuit card 62 (not shown) by way of electrically conductive pins. Such electrical signal paths may terminate at the circuit card 62 or return to an electrical trace 149 (e.g., on the other side of the gap).

In another embodiment, the connector body 56 encapsulates electrically conductive pins that provide the electrical signal paths between the electrical contacts of the plug member 74 and receptacle member 104 (i.e., straight-through pins) and between the electrical contacts of either member 74, 104 and the circuit card 62 (i.e., pins that bend approximately perpendicularly from the plane of the connector body and project from the side thereof).

Figure 10:
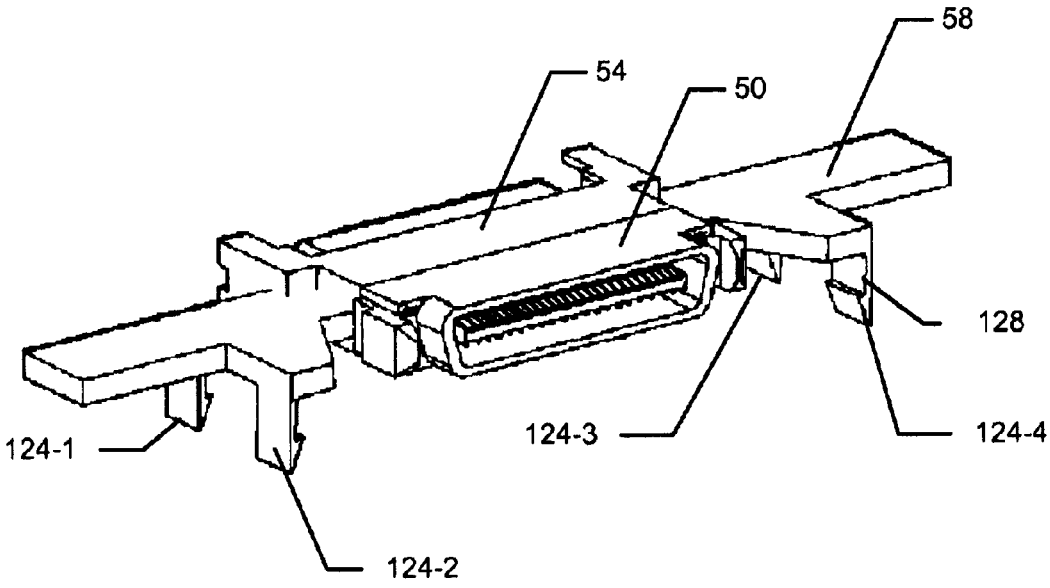
FIG. 10 is a diagram of an embodiment of the electrical connector assembly with an empty cardholder.
Figure 11:
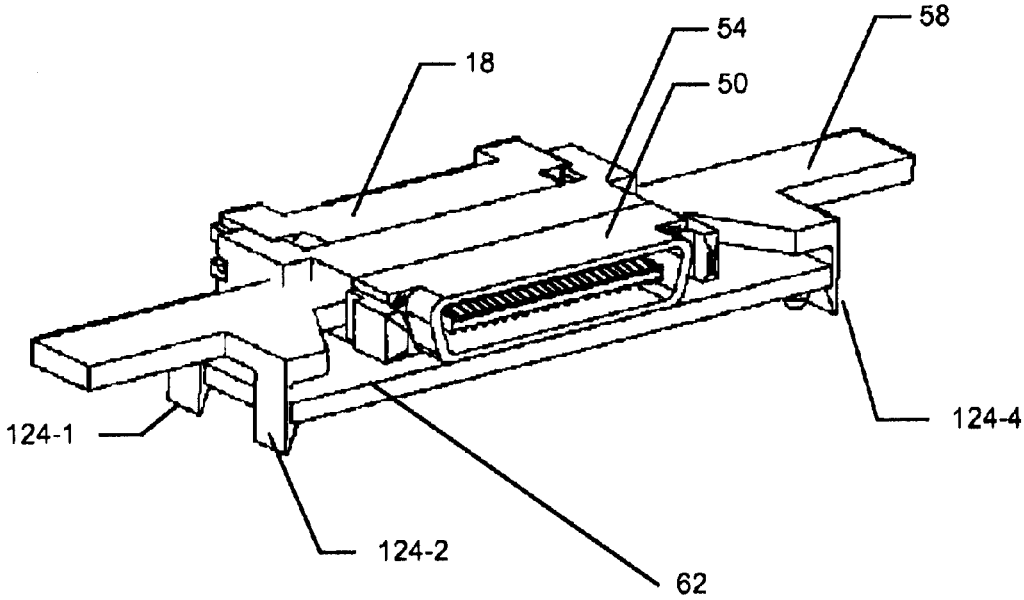
FIG. 11 is a diagram of the electrical connector assembly with a circuit card held by the holding means of the cardholder.

FIG. 10 shows an embodiment of the electrical connector assembly 26 (without the circuit card 62), constructed in accordance with the invention. The posts 124 of the cardholder portion 58 are merely illustrative of a means for holding the circuit card 62. FIG. 11 shows the electrical connector assembly 26 with the circuit card 62 being held by the posts 124 of the cardholder portion 58. Also shown is the disk drive connector 18 physically and electrically coupled to the receptacle connector portion 54 of the electrical connector assembly 26.

Figure 12:
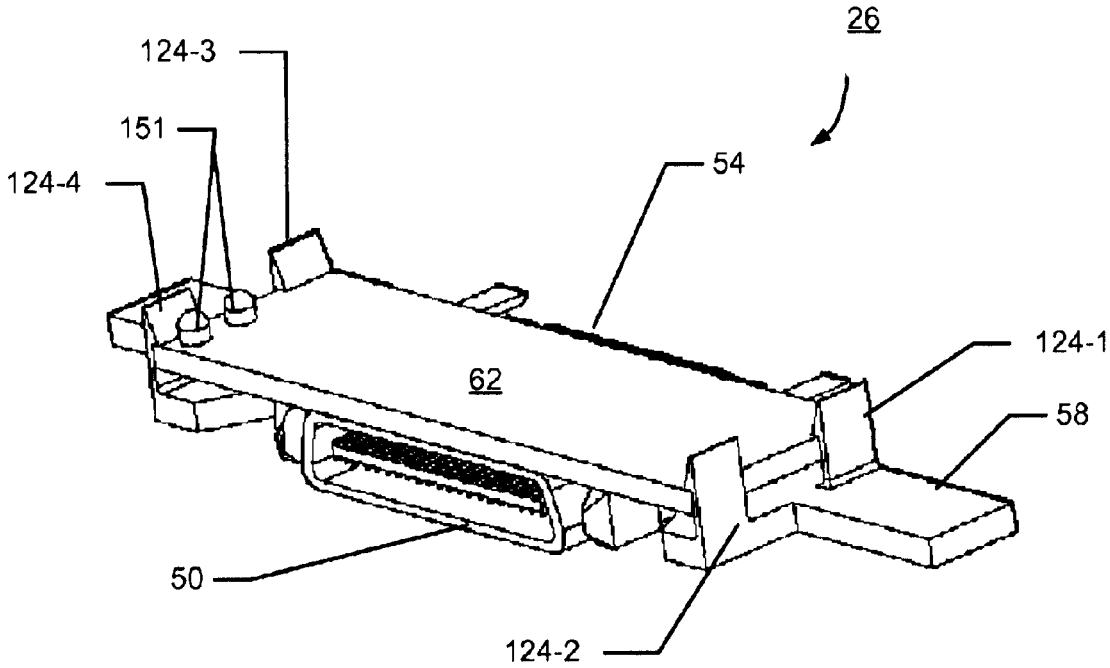
FIG. 12 is a bottom view diagram of the electrical connector assembly.
Figure 13:
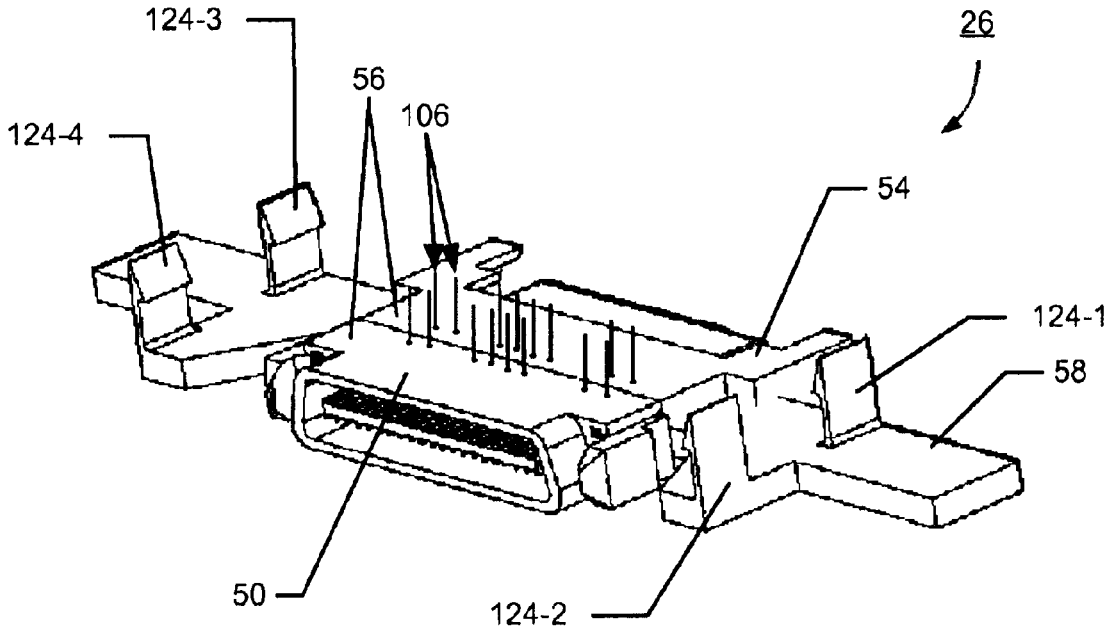
FIG. 13 is a bottom view of the electrical connector assembly without the circuit card to show electrically conductive pins projecting through the side of the connector body.
Figure 14:
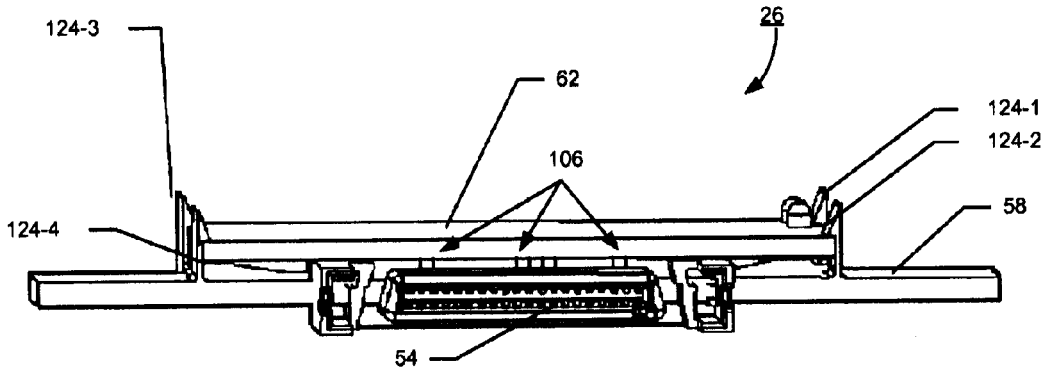
FIG. 14 is a disk-drive-side view of the electrical connector assembly, with the circuit card.

FIG. 12 shows a bottom view of the electrical connector assembly 26 with the circuit card 62. The bottom view shows a pair of LEDs 151 that can be in communication with the circuitry on the circuit card 62. FIG. 13 shows a bottom view of the electrical connector assembly 26 without the circuit card 62. Electrically conductive pins 106 project from the side of the connector body 56 adjacent to the circuit card 62. FIG. 14 shows a disk-drive-side view of the electrical connector assembly 26, in which are visible the cardholder portion 58, circuit card 62, receptacle connector portion 54, and pins 106 that electrically coupling the circuit card 62 to the connector body 56.

Figure 15:
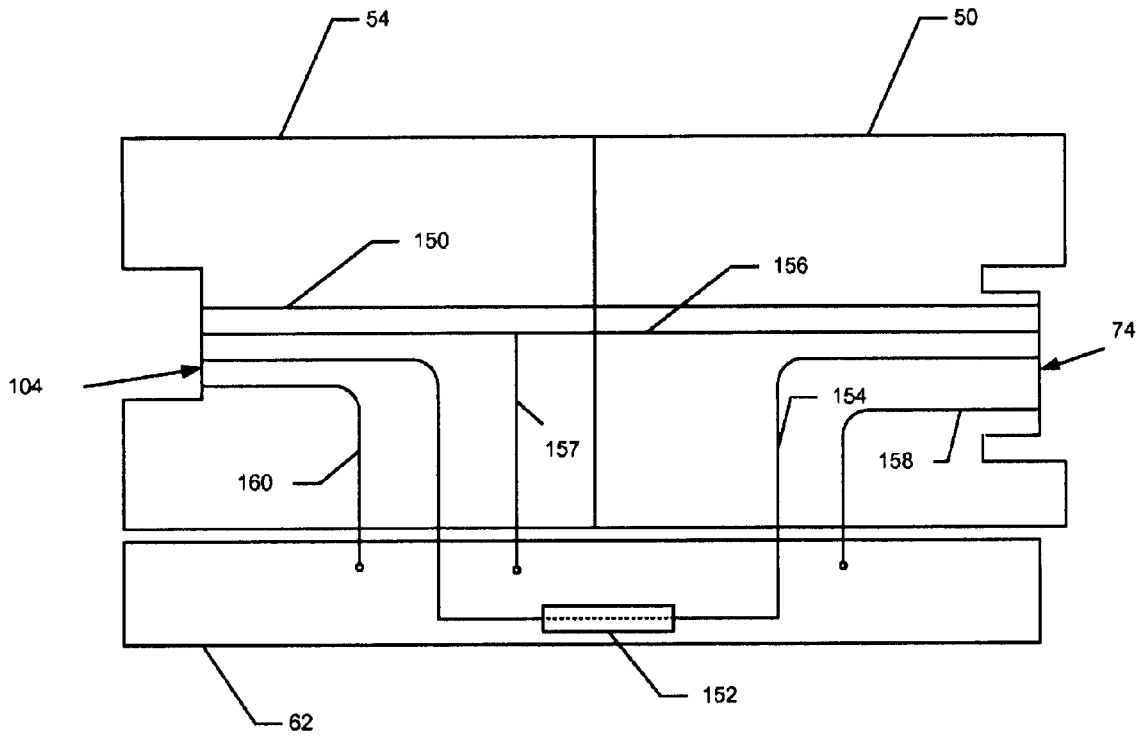
FIG. 15 is a diagram of examples of various types of electrical signal paths in an embodiment of the electrical connector assembly of the invention.

FIG. 15 shows examples of various types of electrical signal paths in one embodiment of the electrical connector assembly 26. Some electrical signal paths go straight through the connector body 56, as exemplified by electrical signal path 150 (i.e., directly through the connector portions 50, 54, from the midplane connector 38 of FIG. 2 to the disk drive connector 18).

Other electrical signal paths pass between an electrical contact 76 of the plug member 74 and an electrical contact 110 of the receptacle member 104 through the circuit card 62 (as typified by the electrical signal path 154). Circuitry 152 on the circuit card 62 can receive and operate upon electrical signals traversing this signal path 154 (e.g., to convert a 12-volt voltage supply signal from the midplane 32 into a 5-volt supply signal for the disk drive 14).

Some of the electrical paths can terminate at the circuit card 62 and provide "test" nodes at which a signal probe from external electronic equipment can analyze the signals passing therethrough. For example, an electrical signal path 156 passes through from the receptacle member 104 of the receptacle connector portion 54 and has a tap 157 (i.e., an electrical conductor) that extends perpendicularly therefrom and terminates at the circuit card 62. As another example, an electrical signal path 158 includes an electrical conductor that extends from the plug member 74 of the plug connector portion 50, bends approximately perpendicularly therefrom, and terminates at the circuit card 62. Electrical signal path 160 exemplifies yet another type of signal path that terminates at the circuit card 62, this path originating from an electrical contact of the receptacle member 104.

Figure 16A:
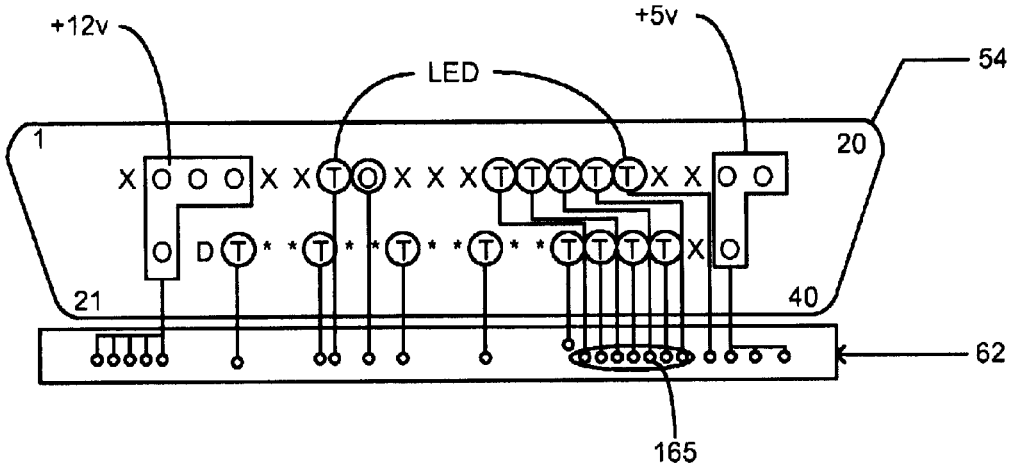
FIGS. 16A and 16B are, respectively, exemplary pin descriptions (i.e., "pin outs") of the plug and receptacle connector portions of an embodiment of the electrical connector assembly of the invention.
Figure 16B:
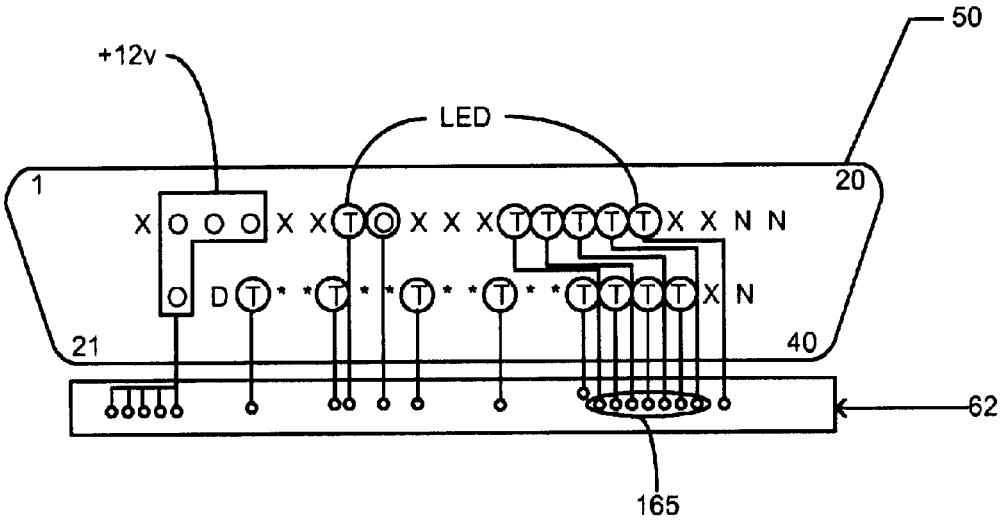

FIGS. 16A and 16B show, respectively, exemplary pin descriptions (i.e., "pin outs") of the receptacle and plug connector portions 54, 50 of the electrical connector assembly 26. Numbers for representative pin locations appear in the corners of the connector portions. Table 1 associates each pin location with a number and a signal name.

TABLE 1

| Pin Number | Signal Name | Comments |
|---|---|---|
| 1 | −EN Bypass Port 1 | Output Driven High When Port 1 is Operating Correctly |
| 2 | +12 Vout/+12 vin | +12 v out on receptacle (drive end)/ +12 v on plug (midplane end) |
| 3 | +12 Vout/+12 vin | +12 v out on receptacle (drive end)/ +12 v on plug (midplane end) |
| 4 | +12 Vout/+12 vin | +12 v out on receptacle (drive end)/ +12 v on plug (midplane end) |

TABLE 1-continued

| Pin Number | Signal Name | Comments |
|---|---|---|
| 5 | −Parallel ESI | Input to allow ESI operation using the SELx pins |
| 6 | GND | |
| 7 | ACTLED | Output to drive the activity LED cathode |
| 8 | Reserved | |
| 9 | Start1 | Input to control spin-up behavior |
| 10 | Start2 | Input to control spin-up behavior |
| 11 | −EN | Bypass Port 2 Output driven high when port 2 is operating correctly |
| 12 | SEL6 | Device ID bit 6/ESI write clock |
| 13 | SEL5 | Device ID bit 5/ESI read clock |
| 14 | SEL4 | Device ID bit 4/ESI acknowledge clock |
| 15 | SEL3 | Device ID bit 3/ESI bit 3 |
| 16 | FLTLED | Output to drive the fault LED cathode |
| 17 | DEVCTRL2 | Input to control interface speed |
| 18 | DEVCTRL1 | Input to control interface speed |
| 19 | +5 V | Drive side only |
| 20 | +5 V | Drive side only |
| 21 | +12 Vout/+12 vin | +12 v out on receptacle (drive end)/ +12 v on plug (midplane end) |
| 22 | GND | |
| 23 | GND | |
| 24 | +IN1 | Fibre Channel Input |
| 25 | −IN1 | Fibre Channel Input |
| 26 | GND | |
| 27 | +IN2 | Fibre Channel Input |
| 28 | −IN2 | Fibre Channel Input |
| 29 | GND | |
| 30 | +OUT1 | Fibre Channel Output |
| 31 | −OUT1 | Fibre Channel Output |
| 32 | GND | |
| 33 | +OUT2 | Fibre Channel Output |
| 34 | −OUT2 | Fibre Channel Output |
| 35 | GND | |
| 36 | SEL2 | Device ID bit 2/ESI bit 2 |
| 37 | SEL1 | Device ID bit 1/ESI bit 1 |
| 38 | SEL0 | Device ID bit 0/ESI bit 0 |
| 39 | DEVCTRL0 | Input to control interface speed |
| 40 | +5 V | Drive side only |

In this exemplary embodiment, the signal names are associated with Fibre Channel signals. At each numbered pin location is a symbol (O, X, T, *, or D) indicating the type of electrical signal path with which that pin (i.e., electrical contact) is coupled. Pin locations marked with an "X" or with an asterisk (*) are coupled to electrical paths that pass directly (i.e., straight) through the connector portions 50, 54, as exemplified by electrical signal path 150 in FIG. 15. Those locations marked with an asterisk signify high-speed pass through paths.

Pin locations identified by an "O" are "interrupted" electrical paths that pass between the connector portions 50, 54 through circuitry 152 of the circuit card 62, as exemplified by electrical signal path 154 in FIG. 15. Pin locations marked with a "T" pass to the circuit card 62 (and can "tap" at the circuit card 62) for purposes of providing test nodes, as exemplified by electrical signal path 156 in FIG. 15. Some of the pin locations designated with a "T" (reference numeral 165) may instead be pulled up to an internal +5 v level (i.e., within the connector assembly) using a pull-up resistor (e.g., 10K). A pin location with a D designation indicates that the pin is open (i.e., disconnected); those with an N designation indicates that the pin is a "no connect".

While the invention has been shown and described with reference to specific preferred embodiments, it should be understood by those skilled in the art that various changes in form and detail may be made therein without departing from the spirit and scope of the invention as defined by the following claims. For example, other embodiments of electrical connector assemblies constructed in accordance with the invention can have two plug connector portions at opposite ends of the connector body, instead of a plug connector portion and a receptacle connector portion. Alternatively, the connector body can be comprised of two receptacle connector portions. As other examples, the circuit card can be disposed adjacent to the other side of the connector body, or circuit cards can be disposed adjacent both sides of the connector body (which, in this embodiment, has electrically conductive pins emerging from both sides thereof).

Further, although described herein with reference to disk array enclosures, electrical connector assemblies of the invention can find application within other types of electronics enclosures, i.e., wherever an external adapter board or circuitry is employed to provide an interface to an electronics assembly, e.g., to enhance its functionality or to perform signal conversions.

What is claimed is:

1. An electrical connector assembly comprising:

an electrical connector body with a first electrical connector at a first end, with a second electrical connector at a second end opposite the first end, and a side surface extending from the [receptacle connector portion] *first electrical connector* at the first end to the [plug receptacle portion] *second electrical connector* at the second end, each electrical connector having a plurality of electrical contacts, the electrical connector body having an electrical conductor that is in electrical communication with at least one of the electrical contacts and extends from the side surface of the connector body;

a circuit card having a surface disposed adjacent to and facing the side surface of the connector body, the surface of the circuit card having an electrical conductor that is in electrical communication with the electrical conductor extending from the side surface of the connector body; and means for holding the circuit card adjacent to the connector body.

2. The electrical connector assembly of claim 1, wherein each of the electrical connectors of the connector body is a plug electrical connector.

3. The electrical connector assembly of claim 1, wherein each of the electrical connectors of the connector body is a receptacle electrical connector.

4. An electrical connector assembly comprising:

an electrical connector having a connector body with a receptacle connector portion at a first end of the connector body, a plug connector portion at a second end of the connector body opposite the first end, and a side surface extending from the receptacle connector portion at the first end to the plug [receptacle] *connector* portion at the second end, the receptacle connector portion having electrical contacts within an opening for mating with a plug electrical connector at the first end of the connector body, and the plug connector portion having electrical contacts within an opening for mating with a receptacle electrical connector at the second end of the connector body, the connector body having an electrical conductor that is in electrical communication with at least one of the electrical contacts and extends from the side surface of the connector body; and a circuit card physically coupled to the connector body, the circuit [board] *card* having a surface disposed adjacent to and facing the side surface of the connector body, the surface of the circuit card having an electrical conductor that is in electrical communication with the electrical conductor extending from the side surface of the connector body, to provide thereby an electrical path from the circuit card to the at least one electrical contact.

5. The electrical connector assembly of claim 4, wherein one of the electrical contacts of the electrical connector is in electrical communication with the circuit card over an electrical signal path that includes the electrical conductor and terminates at the circuit card.

6. The electrical connector assembly of claim 4, wherein the circuit card includes circuitry that provides logic signal conditioning.

7. The electrical connector assembly of claim 4, wherein the circuit card is a flex circuit.

8. The electrical connector assembly of claim 4, wherein the plug and receptacle connector portions of the electrical connector are SCA-2 standard compliant SCA (single connector attachment) connectors.

9. The electrical connector assembly of claim 4, wherein one of the electrical contacts of the plug connector portion is in electrical communication with one of the electrical contacts of the receptacle connector portion over an electrical signal path that includes the electrical conductor and passes through the circuit card.

10. The electrical connector assembly of claim 9, wherein the electrical signal path carries a 12-volt power supply signal and the circuit card includes circuitry for converting the 12-volt power supply signal into a 5-volt power supply signal.

11. The electrical connector assembly of claim 4, wherein one of the connector portions of the electrical connector is configured to mate electrically and physically with an electrical connector of a disk drive.

12. The electrical connector assembly of claim 11, wherein the circuit card includes circuitry that provides on-off control functionality for the disk drive.

13. The electrical connector assembly of claim 11, wherein the circuit card includes circuitry that provides soft-start control for the disk drive.

14. The electrical connector assembly of claim 11, wherein the circuit card includes circuitry that provides current-limit protection for the disk drive.

15. The electrical connector assembly of claim 4, further comprising means for holding the circuit [board] *card* adjacent to the one side of the connector body.

16. The electrical connector assembly of claim 15, wherein the means for holding includes a holder body extending from the connector body and posts extending perpendicularly from one side of the holder body, each post having a notch for holding an edge of the circuit card.

17. The electrical connector assembly of claim 16, wherein the means for holding, the plug connector portion, and the receptacle connector portion are an integrally formed component.

18. An electronics enclosure comprising:

a disk drive assembly having a disk drive and a disk drive connector extending from one end of the disk drive;

a midplane having a midplane connector extending from one side thereof; and an electrical connector assembly electrically coupling the disk drive assembly to the midplane, the electrical connector assembly comprising:

an electrical connector having a connector body with a receptacle connector portion at a first end of the connector body, a plug connector portion at a second end of the connector body opposite the first end, and a side surface extending from the receptacle connector portion at the first end to the plug [receptacle] *connector* portion at the second end, the receptacle connector portion having electrical contacts within an opening for mating with a plug electrical connector at the first end of the connector body, and the plug connector portion having electrical contacts within an opening for mating with a receptacle electrical connector at the second end of the connector body, the connector body having an electrical conductor that is in electrical communication with at least one of the electrical contacts and extends from the side surface of the connector body; and a circuit card physically coupled to the connector body, the circuit [board] *card* having a surface disposed adjacent to and facing the side surface of the connector body, the surface of the circuit card having an electrical conductor that is in electrical communication with the electrical conductor extending from the side surface of the connector body, to provide thereby an electrical path from the circuit card to the at least one electrical contact.

19. The electronics enclosure of claim 18, wherein the circuit card includes circuitry that provides on-off control functionality for the disk drive.

20. The electronics enclosure of claim 18, wherein the circuit card includes circuitry that provides soft-start control for the disk drive.

21. The electronics enclosure of claim 18, wherein the circuit card includes circuitry that provides current-limit protection for the disk drive.

22. The electronics enclosure of claim 18, wherein the circuit card includes circuitry that provides logic signal conditioning.

23. The electronics enclosure of claim 18, wherein the circuit card is a flex circuit.

24. The [electrical connector assembly] *electronics enclosure* of claim 18, wherein the plug and receptacle connector portions are SCA-2 standard compliant SCA (single connector attachment) connectors.

25. The electronics enclosure of claim 18, wherein one of the electrical contacts of the plug connector portion is in electrical communication with one of the electrical contacts of the receptacle connector portion over an electrical signal path that includes the electrical conductor and passes through the circuit card.

26. The electronics enclosure of claim 25, wherein the electrical signal path carries a 12-volt power supply signal and the circuit card includes circuitry for converting the 12-volt power supply signal into a 5-volt power supply signal used by the disk drive for operation.

27. The electronics enclosure of claim 18, further comprising means for holding the circuit [board] *card* adjacent to the one side of the connector body.

28. The electronics enclosure of claim 27, wherein the means for holding includes a holder body and posts extending perpendicularly from one side of the holder body, each post having a notch for holding an edge of the circuit card.

* * * * *